3,113,967
ADDITION OF CARBONYL FLUORIDE TO POLYFLUORO-OLEFINS
Frank S. Fawcett, Wilmington, Del., assignor to E. I. du Pont de Nemours and Company, Wilmington, Del., a corporation of Delaware
No Drawing. Filed Oct. 25, 1960, Ser. No. 64,728
12 Claims. (Cl. 260—544)

This invention relates to the preparation of compounds containing one or more —C(O)F groups and in particular polyfluorocarbonoyl fluorides.

A number of methods have been described for preparing acyl halide derivatives of aliphatic fluorine compounds (cf., Lovelace, Rausch and Postelnek, "Aliphatic Fluorine Compounds," Reinhold Publishing Corp., New York, 1958, pp. 220–222). Some of these methods are directed specifically to the preparation of acyl chlorides (e.g., the cleavage of ethers with aluminum chloride) or bromides (e.g., the reaction of acid anhydrides with sodium bromide), and could not be used directly for the preparation of the corresponding acyl fluorides. The most commonly used methods involve carboxylic acids or suitable derivatives thereof as starting materials. The derivatives thus employed include salts or the respective acyl chlorides, bromides or iodides.

The foregoing routes to polyfluorocarbonoyl fluorides are for the most part dependent upon starting materials, such as perfluoroalkanecarboxylic acids, that are not commonly available in large quantity or at low cost, or that may be obtainable only by complicated multi-step syntheses when unusual molecular structures are desired, e.g., perfluoropivalic acid. It is an object of the present invention to satisfy the existent need for new methods of preparing polyfluorocarbonoyl fluorides—methods that are simple and directly applicable to commercially available raw materials such as the simple polyfluorinated ethylenically unsaturated compounds, and that also provide hitherto impractical variations in molecular structure.

I have now discovered a method for making polyfluorocarbonoyl fluorides from readily available polyfluorinated ethylenically unsaturated raw materials. This new method comprises reacting carbonyl fluoride at 50° to 250° C. with at least one compound of the formulae

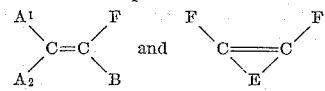

wherein $A^1$ and $A^2$ are fluorine, perfluoroalkyl or perfluoroalkenyl, B is fluorine, perfluoroalkyl, perfluoroalkenyl or alkoxy, E is perfluoroalkylene, and where at least one of the A and B groups must be fluorine, in the presence of a fluoride salt capable of providing fluoride ions. The number of chain carbons in the polyfluorinated ethylenically unsaturated reactant is not critical. Exemplary of the compounds advantageously used are those containing a total of from 2 to 12 chain carbons.

In a preferred form of the invention, the reaction is conducted in an organic nitrile solvent, e.g., acetonitrile or benzonitrile, the presence of a fluoride salt capable of providing fluoride ions, e.g., a non-oxidizing fluoride or bifluoride of the elements of group I of the periodic table, a non-oxidizing fluoride of a metal of the group consisting of iron, cobalt, nickel, zinc, cadmium, tin, lead, and bismuth, a quaternary ammonium fluoride, or a tertiary amine hydrofluoride, at a temperature of 75–200° C.

The use of an organic nitrile solvent in conjunction with the fluoride-ion producing salt is beneficial because it increases the yield of acyl fluoride and permits use of lower reaction temperatures; however, its use is not essential to the process of the invention.

The reaction of carbonyl fluoride with a polyfluorinated ethylenically unsaturated compound by the process of this invention is conveniently carried out in a closed vessel under the autogenous pressures of the reactants at the reaction temperature. For example, the normally solid or liquid components of the reaction mixture, i.e., the nitrile solvent, the fluoride salt catalyst, and a polyfluorinated ethylenically unsaturated reactant, when it is higher-boiling, are placed in the open reaction vessel at room temperature. The vessel is then closed, cooled to about −80° C., and evacuated, and then the carbonyl fluoride is introduced. However, when the polyfluorinated ethylenically unsaturated reactant is lower boiling or normally gaseous, the catalyst and solvent are first placed in the open reaction vessel, the vessel is closed, cooled and evacuated, and then the polyfluorinated ethylenically unsaturated reactant and the carbonyl fluoride are introduced into the vessel. The reaction is then brought about by heating and agitating the confined reaction mixture at the appropriate elevated temperature or temperatures.

To avoid the formation of undesirable by-products, the temperature of the reaction is kept as low as operability permits. Generally, the reactants are heated slowly while being agitated, the heating being conducted by a stepwise procedure wherein the reactants are maintained for short periods of time at progressively higher temperatures. This procedure permits smooth operation of the process without sudden increases in pressure. However, this procedure is not essential for operability and the reactants can, if desired, be heated in one step to the reaction temperature.

The presence of carbonyl fluoride assures anhydrous reaction conditions because of its strong reactivity with water. Accordingly, it is advantageous to employ substantially anhydrous reaction components in order to avoid waste of carbonyl fluoride and to ensure its availability for reaction with the polyfluorinated ethylenically unsaturated compound.

The material of which the reaction vessel is constructed is not critical but it is advantageous to use a vessel which is resistant to attack by any of the components of the reaction mixture, including hydrogen fluoride which would be formed as a result of incidental hydrolysis of carbonyl fluoride. Metals suitable as materials of construction include copper, nickel, monel, and nickel-iron-molybdenum alloy.

Available compounds exemplary of those used to advantage in the process of this invention are tetrafluoroethylene, hexafluoropropylene, perfluorobutene-2, perfluoroisobutylene and 1,4 - perfluoropentadiene. Additional useful compounds are perfluorocyclobutene, which may be obtained by methods described in Lovelace et al. (loc. cit.), p. 126, and methyl trifluorovinyl ether, which is described in U.S. 2,917,548.

The molar proportions of carbonyl fluoride and the polyfluoro ethylenically unsaturated reactant are generally not critical in the process of this invention, i.e., the polyfluoroacyl fluoride ordinarily is the sole product of the reaction. However, when hexafluoropropylene is the ethylenically unsaturated reactant, there are two products, namely, perfluoroisobutyryl fluoride and bisperfluoroisopropyl ketone, which are obtained in varying proportions depending upon the molar ratio of the reactants. The acyl fluoride is obtained in larger amount when the mole ratio of hexafluoropropylene to carbonyl fluoride is not more than 1.0, and the ketone is obtained is larger amount when the mole ratio is 2.0 or more.

The invention is illustrated in greater detail in the following examples.

*Example I*

A mixture of 26 g. (0.26 g. mole) of tetrafluoroethylene, 17 g. (0.26 g. mole) of carbonyl fluoride, 2.0 g. of cesium fluoride and 27 ml. of acetonitrile was heated under autogenous pressure at 100° C. for 4 hours and then at 150° C. for 5 hours, in a 240 ml. pressure vessel constructed of a corrosion-resistant nickel-iron-molybdenum alloy. Low temperature distillation of the gaseous products yielded 5.7 g. (13%) of perfluoropropionyl fluoride, B.P. —28 to —23° C. The identity of the product was confirmed by n-m-r spectroscopy.

Further identification was obtained by bubbling 4.0 g. of the product into a solution of 5 g. of aniline in 30 ml. of diethyl ether at a temperature of —30° C. The resultant solid product, which was isolated by filtration and purified by recrystallization from an ethanol-water mixture, was perfluoropropionanilide, M.P. 99.5–100° C.

Analysis for $C_9H_6F_5ON$:

|  | C | H | F | N |
|---|---|---|---|---|
| Calc'd (wt. percent) | 45.20 | 2.53 | 39.72 | 5.86 |
| Found (wt. percent) | 46.14 | 2.55 | 39.03 | 5.95 |

*Example II–A*

A mixture of 30 ml. of acetonitrile, 2.0 g. of anhydrous potassium fluoride, 25 g. (0.17 g. mole) of hexafluoropropylene and 20 g. (0.30 g. mole) of carbonyl fluoride was heated under autogenous pressure at 50° C. for 2 hours, at 75° C. for 2 hours, and at 100° C. for 5 hours, in a 240 ml. pressure vessel constructed of a nickel-iron-molybdenum alloy. The volatile product, amounting to 44 g., was recovered in a stainless steel receiver cooled in liquid nitrogen. Distillation of the product yielded 30 g. (83.5%) of water-white perfluoroisobutyryl fluoride, B.P. —2° to +4° C. The product was identified by its vigorous reactions with water and with alcohol to form acidic solutions, by its fluorine n-m-r and mass spectra which were consistent with the structure

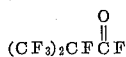

by its proton magnetic resonance spectrum which showed the absence of hydrogen, and by infrared analysis which showed strong carbonyl absorption at 1900 cm.$^{-1}$.

Analysis for $C_4F_8O$:

```
                                              F
Calc'd (wt. percent) ------------------------ 70.4
Found (wt. percent) ------------------------- 71.1, 71.1
```

*Example II–B*

A mixture of 50 ml. of acetonitrile, 2.3 g. of anhydrous cesium fluoride, 60 g. (0.4 g. mole) of hexafluoropropylene and 13 g. (0.197 g. mole) of carbonyl fluoride was heated under autogenous pressure at 75° C. for 4 hours and then at 100° C. for 5 hours in a 240 ml. pressure vessel constructed of a corrosion-resistant nickel-iron-molybdenum alloy. A volatile portion of the product was caught in a cold trap and combined with the lower phase of the two-layered liquid portion of the product. Distillation of this mixture yielded a small forerun (3–4 g.) of perfluoroisobutyryl fluoride and 28.2 g. of a fraction boiling at 71–72° C. The latter fraction was identified as bis-perfluoroisopropyl ketone by n-m-r and infrared spectroscopy and by elemental analysis for carbon and fluorine.

Analysis for $C_7F_{14}O$:

|  | C | F |
|---|---|---|
| Calc'd (wt. percent) | 22.97 | 72.66 |
| Found (wt. percent) | 22.43 | 72.54 |

The experiment was repeated as above except for substitution of the cesium fluoride by potassium bifluoride and by silver fluoride, and the fluoroketone was obtained in yields of 43.4 g. and 34.0 g., respectively.

*Example III*

A mixture of 30 ml. of acetonitrile, 2.5 g. of cesium fluoride, 90 g. of a 1:5 mixture of perfluoroisobutylene and perfluorocyclobutane [i.e., 15 g. (0.075 g. mole) of perfluoroisobutylene] and 13 g. (0.20 g. mole) of carbonyl fluoride was heated at 150° C. for 12 hours under autogenous pressure in a 240 ml. pressure vessel constructed of a nickel-iron-molybdenum alloy. The combined products of three such runs were distilled to give 55.8 g. of liquid, B.P. 27–30° C. The distilled product was shown to contain about 50% perfluoropivaloyl fluoride,

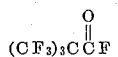

by gas chromatographic and infrared analyses (carbonyl absorption at 5.3μ).

*Example IV*

A mixture of 40 g. (0.2 g. mole) of perfluorobutene-2, 20 g. (0.3 g. mole) of carbonyl fluoride, 2.5 g. of cesium fluoride, and 35 ml. of acetonitrile was heated under autogeneous pressure at 150° C. for 12 hours in a 240 ml. pressure vessel constructed of a nickel-iron-molybdenum alloy. Distillation of the reaction products gave about 10 g. of unchanged perfluorobutene-2, B.P. 4–9° C., and 38 g. (71%) of perfluoro-α-methylbutyryl fluoride, B.P. 22–27° C. The identity of the product was confirmed by n-m-r spectroscopy.

The product was further identified by its reaction with aniline to yield the anilide of perfluoro-α-methylbutyric acid, M.P. 80.5–81.5° C.

Analysis for $C_{11}H_6F_9ON$:

|  | C | H | F | N |
|---|---|---|---|---|
| Calc'd (wt. percent) | 38.95 | 1.78 | 50.42 | 4.13 |
| Found (wt. percent) | 39.72 | 1.96 | 50.76 | 4.15 |

*Example V*

A mixture of 24 g. (0.15 g. mole) of perfluorocyclobutene, 15 g. (0.23 g. mole) of carbonyl fluoride, 3.0 g. of cesium fluoride, and 30 ml. of acetonitrile was heated under autogenous pressure at 125° C. for 4 hours and at 150° C. for 5 hours in a 240 ml. pressure vessel constructed of a nickel-iron-molybdenum alloy. Distillation of the reaction mixture yielded 18.6 g. (54%) of perfluorocyclobutanecarbonyl fluoride, B.P. 35–39° C. Identity of the product was confirmed by n-m-r spectroscopy.

The product was further identified by its reaction with aniline to yield the anilide of perfluorocyclobutanecarboxylic acid, M.P. 137.5–138° C.

Analysis for $C_{11}H_6F_7ON$:

|  | C | H | F | N |
|---|---|---|---|---|
| Calc'd (wt. percent) | 43.87 | 2.01 | 44.16 | 4.65 |
| Found (wt. percent) | 44.47 | 2.15 | 44.28 | 4.85 |

*Example VI*

A. A mixture of 13.0 g. (0.116 g. mole) of methyltrifluorovinyl ether and 20 g. (0.3 g. mole) of carbonyl fluoride was heated under autogeneous pressure at 50° C. for 3 hours, at 100° C. for 3 hours, and then at 125° C. for 10 hours, in a 240 ml. pressure vessel constructed of a nickel-iron-molybdenum alloy. The reactor was cooled to room temperature, and 33 g. of volatile products were removed into a stainless steel receiving cylinder. Distillation of the volatile products yielded 3.1 g. of a fraction, B.P. 40–53° C., which showed strong infrared absorption at 5.32μ indicative of the presence of an acyl fluoride.

B. A mixture of 19 g. (0.17 g. mole) of methyl trifluorovinyl ether, 25 ml. of benzonitrile, 5 drops of a syrupy preparation of tetraethylammonium fluoride, and 25 g. (0.38 g. mole) of carbonyl fluoride was heated under autogeneous pressure at 50° C. for 3 hours, at 100° C. for 3 hours, and then at 125° C. for 10 hours, in a pressure vessel constructed of a nickel-iron-molybdenum alloy. There was obtained 42 g. of volatile product, which was collected in a stainless steel receiving cylinder. Distillation of the product yielded 18.7 g. (62%) of β-methoxytetrafluoropropionyl fluoride, B.P. 48–51° C.

Analysis for $C_4H_3F_5O_2$:

|  | C | H | F |
| --- | --- | --- | --- |
| Calc'd (wt. percent) | 26.96 | 1.70 | 53.32 |
| Found (wt. percent) | 27.23, 26.99 | 2.09, 2.03 | 53.70 |

The identity of the product was confirmed by infrared and n-m-r spectroscopy. The product was further identified by its reaction with methanol to yield methyl β-methoxytetrafluoropropionate, B.P. 130–136° C., $n_D^{24}$ 1.3368–1.3371. The fluorine n-m-r pattern and the infrared spectrum of this ester were consistent with the assigned structure.

A comparison of sections A and B of Example VI reveals the combined effect of the fluoride salt and the organic solvent upon the reaction therein involved. The use of fluoride salt and the solvent in section B resulted in approximately a 4-fold increase in the yield of the fluoroacyl fluoride of section A.

*Example VII*

A mixture of 20 g. (0.3 g. mole) of carbonyl fluoride, 21.2 g. of 1,4-perfluoropentadiene (0.1 g. mole), 2.0 g. of cesium fluoride and 30 ml. of acetonitrile was heated under autogenous pressure at 150° C. for 12 hours. Eleven grams of carbonyl fluoride was recovered in the gaseous fraction of the product. Distillation of the liquid product yielded 11.32 g. of a mixture, B.P. 43–74° C., which contained mono- and diacid fluorides and acetonitrile. The mixture was treated with 20 ml. of ethanol to convert the acid fluorides to esters, and the esterified mixture was distilled. A fraction boiling at 168–170° C. weighed 2.66 g. and appeared to be a diester, probably

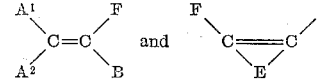

Analysis for $C_{11}H_{10}F_{10}O_4$:

|  | C | H | F |
| --- | --- | --- | --- |
| Calc'd (wt. percent) | 33.35 | 2.54 | 47.96 |
| Found (wt. percent) | 33.35 | 2.69 | 48.74 |

*Example VIII*

A mixture of 30 g. of hexafluoropropylene (0.20 g. mole), 26 g. of carbonyl fluoride (0.394 g. mole), and 10 g. of anhydrous cesium fluoride was heated under autogenous pressure at 150° C. for 2 hours, at 175° C. for 2 hours, and then at 200° C. for 10 hours in a 240 ml. pressure vessel constructed of a nickel-iron-molybdenum alloy. The volatile product weighed 50 g., of which 46 g. was distilled to yield 20 g. of material boiling at −4 to +2° C. This fraction was found to contain 95% perfluoroisobutyryl fluoride by infrared analysis, the calculated overall conversion of hexafluoropropylene to perfluoroisobutyryl fluoride being 47.6%.

A comparison of this example with Example II-A reveals the beneficial effect of an organic solvent in the process. The use of the solvent in Example II-A resulted in nearly double the yield of the fluoroacyl fluoride at a lower (100° C. versus 200° C.) maximum reaction temperature.

In the process of this invention, one may use a variety of different solvents in which fluoride ion-producing salts are soluble and which are unreactive with carbonyl fluoride under the conditions of the reaction. Thus, in place of the organic nitrile solvents previously mentioned there may be employed the following: aliphatic nitro compounds such as nitromethane; ethers such as ethylene glycol dimethyl ether; and sulfones such as tetramethylene sulfone.

Additional examples of the polyfluorinated ethylenically unsaturated compounds which may be reacted with carbonyl fluoride to produce acyl fluorides are: perfluorobutene-1, perfluoropentene-1, perfluorohexene-3, perfluoro(2-methylpentene-1), perfluorocyclopentene, perfluorocyclohexene, perfluorononene-1, and perfluoro-1,3-butadiene.

The acyl fluorides produced by the process of this invention are important as chemically-active intermediates which may be readily converted to the corresponding carboxylic acids by reaction with water, or to derivatives thereof, e.g., esters and amides, by reaction with alcohols and with ammonia and amines, respectively. As indicated in U.S. 2,559,752 and U.S. 2,567,011, the perfluorocarboxylic acids and their salts are useful as dispersing agents, as ingredients in non-wettable coatings, and as soil-repelling impregnants for paper and textiles.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing polyfluorocarbonyl fluorides which comprises reacting, at a temperature of 50° to 250° C. under substantially anhydrous conditions, an ethylenically unsaturated polyfluoro compound of 2–12 carbons selected from the group consisting of

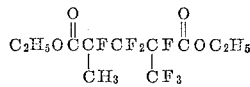

wherein $A^1$ and $A^2$ are selected from the group consisting of fluorine, perfluoroalkyl and perfluoroalkenyl, B is selected from the group consisting of fluorine, perfluoroalkyl, perfluoroalkenyl and alkoxy, E is perfluoroalkylene and at least one of the A and B groups is fluorine, with carbonyl fluoride in the presence of fluoride ions.

2. The process of claim 1 wherein the fluoride ions are provided by a member from the group consisting of fluoride salts and quaternary ammonium fluorides.

3. The process of claim 1 wherein the fluoride ions are provided by a fluoride of an element of group I of the periodic table.

4. The process of claim 1 where the temperature is within the range of 75–200° C.

5. The process of claim 1 carried out in an organic solvent of the group consisting of acetonitrile, benzonitrile, nitromethane, ethylene glycol dimethyl ether and tetramethylene sulfone.

6. The process of claim 1 wherein the reaction is carried out under the autogenous pressure of the reactants.

7. The process of preparing polyfluorocarbonyl fluorides which comprises reacting carbonyl fluoride with a member selected from the group consisting of tetrafluoroethylene, hexafluoropropylene, perfluoroisobutylene, perfluorocyclobutene, perfluorobutene-2, methyl trifluorovinyl ether and 1,4-perfluoropentadiene under substantially anhydrous conditions at a temperature of 75° to 200° C. in the presence of fluoride ions.

8. The process of claim 7 carried out in acetonitrile.

9. The process of claim 7 carried out in benzonitrile.

10. The process of producing perfluoropropionyl fluoride which comprises reacting tetrafluoroethylene with carbonyl fluoride under substantially anhydrous conditions at a temperature of 75° to 200° C. in the presence of fluoride ions.

11. The process of preparing perfluoro-α-methylbutyryl fluoride which comprises reacting carbonyl fluoride with perfluorobutene-2 under substantially anhydrous conditions in the presence of fluoride ions at a temperature of 75° to 200° C.

12. The process of preparing perfluoroisobutyryl fluoride which comprises reacting carbonyl fluoride with hexafluoropropylene under substantially anhydrous conditions at a temperature of 75° to 200° C. in the presence of fluoride ions.

References Cited in the file of this patent
UNITED STATES PATENTS
2,028,012 Reid _____ Jan. 14, 1936

OTHER REFERENCES
Pace: Gazz. Chim. ital., volume 59, pages 578–590 (1929).